United States Patent [19]

Niezoldt

[11] Patent Number: 5,791,738
[45] Date of Patent: Aug. 11, 1998

[54] SEAT BACK FOR VEHICLE SEATS

[75] Inventor: Ralf Niezoldt, Remscheid, Germany

[73] Assignee: Keiper Recaro GmbH & Co., Remscheid, Germany

[21] Appl. No.: 829,234

[22] Filed: Mar. 31, 1997

[51] Int. Cl.[6] .................................................. B60N 2/42
[52] U.S. Cl. ................................ 297/452.18; 297/452.2
[58] Field of Search ........................... 297/452.18, 452.2, 297/216.1, 216.13

[56] References Cited

U.S. PATENT DOCUMENTS

| | | | |
|---|---|---|---|
| 2,169,197 | 8/1939 | Reed | 297/452.18 |
| 2,641,311 | 6/1953 | Ingram, Jr. et al. | 297/452.18 |
| 4,993,778 | 2/1991 | Colin et al. | 297/452.2 |
| 5,310,247 | 5/1994 | Fujimori et al. | 297/452.18 X |

FOREIGN PATENT DOCUMENTS

| | | |
|---|---|---|
| 43 03 005 | 8/1994 | Germany. |
| 194 14941 | 10/1996 | Germany. |

*Primary Examiner*—Peter R. Brown
*Attorney, Agent, or Firm*—Wigman, Cohen, Leitner & Myers, P.C.

[57] ABSTRACT

In the case of a seat back for vehicle seats, in particular motor vehicle seats, with two side outriggers (1), which consist of a back and front support (3,4), which are connected in the area of their lower end section through a connecting body (5) and above the connecting body to each other, both the front support (4) and the back support (3) continue into the transverse spar (2), which connects the side outriggers (1) to each other in the area of its upper end. The front support (4) lies above the connecting body (5) and below the transverse spar (2) on a piece of its segment on the back support (3). On transverse parts (6,7) of the back and front supports (3,4) that extend from one side outrigger (1) to the other in the area of the transverse spar (2) are positioned at an interval from one another over each other. Both transverse parts (6,7) are connected to each other so they are rigid by means of a separator (8) abutting on them.

8 Claims, 4 Drawing Sheets

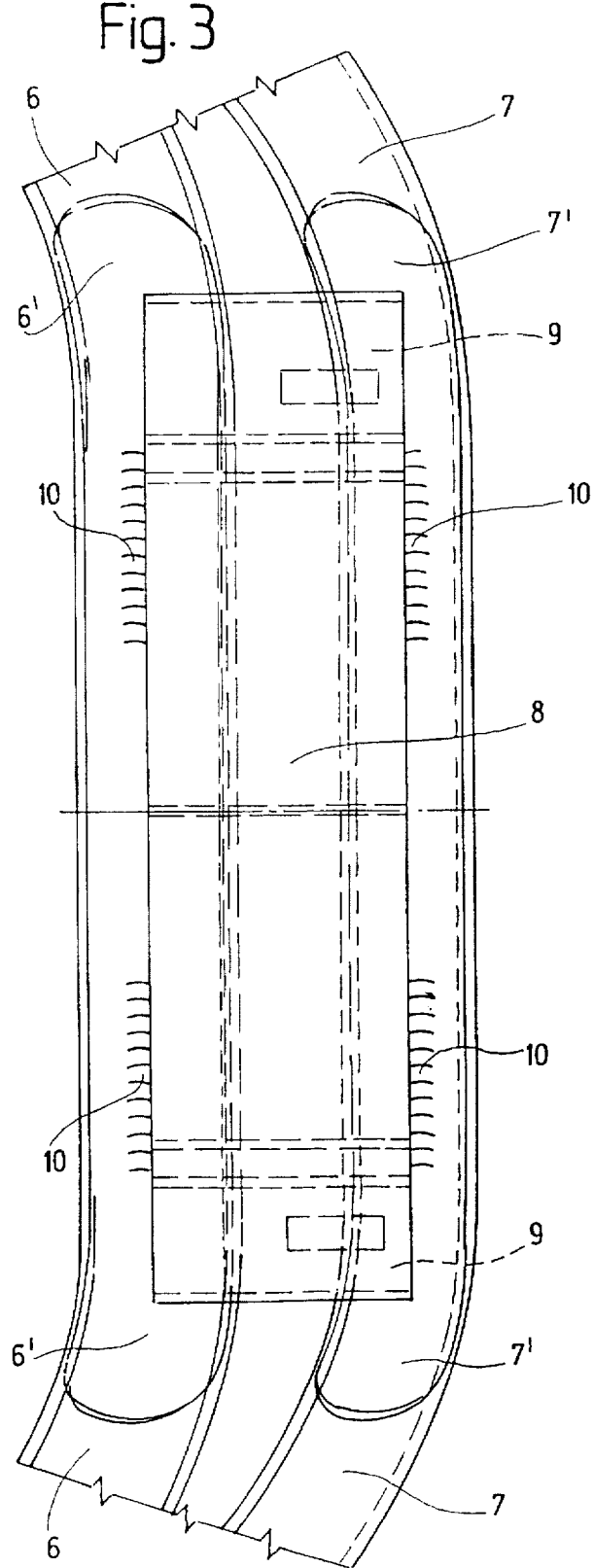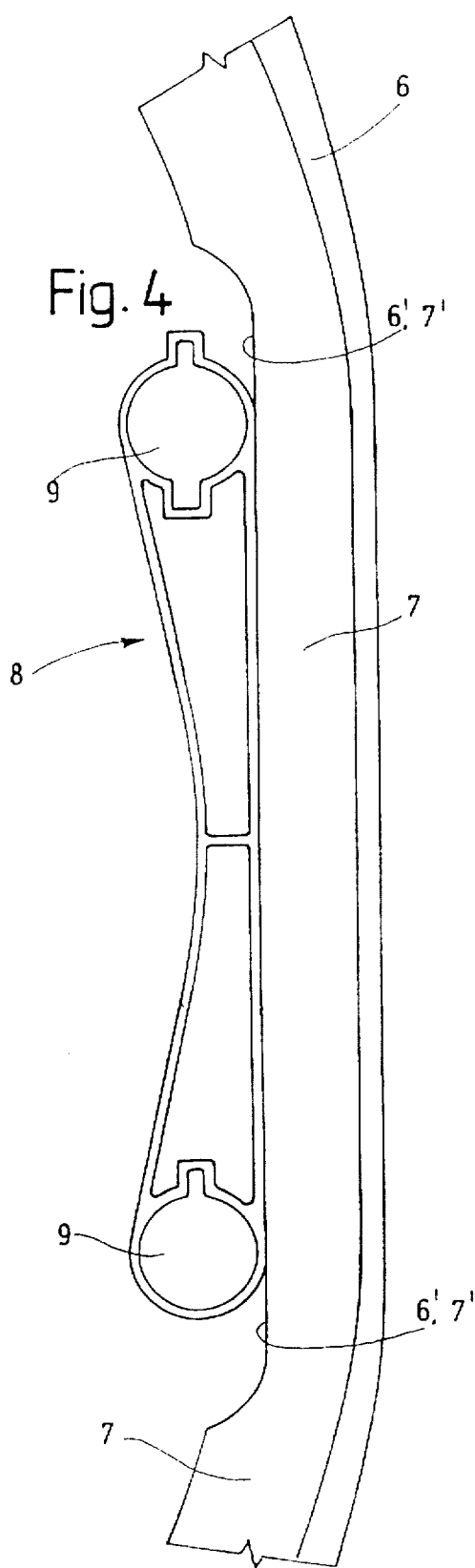

SEAT BACK FOR VEHICLE SEATS

BACKGROUND OF THE INVENTION

The invention relates to a seat back for vehicle seats, in particular motor vehicle seats.

In the case of a known seat back of this type (DE 43 03 006 A1), each of the two front supports on the outside of the corresponding back supports is led through to a transverse spar, which connects the upper end of both front supports to each other and abuts on the back side of the back supports. Because of both the arrangement of the supports and the transverse spars and the connection of each of the two front supports to the corresponding back supports by means of two connecting plates in the area of its lower sides, the seat back's stability under load leaves something to be desired.

OBJECTS AND SUMMARY OF THE INVENTION

A primary object of the invention is to provide a seat back of the type just mentioned, with which it is possible to obtain greater stability under load than conventional seat backs without making the seat back heavier. Other objects and advantages of the invention will become apparent from the description and drawings which follow.

In the case of a preferred working form of the invention, the separator, which connects the transverse parts of both supports to each other, is designed as a holding device for a headrest that makes a separate headrest holding device unnecessary. Advantageously, the transverse parts of the two supports are provided with a flattened out segment on both of their front sides, which lie on a common level and form a bearing surface for the separator. In so doing, it is easy to obtain a definite position of the separator, as well as a highly stable connection between it and the transverse parts. The transverse part of the back supports lies, advantageously, under the transverse part of the front support.

Both due to production considerations and for greater stability under load, the two connecting bodies, which connect the lower end sections of the supports to each other, are as cast bodies that are each provided with two channels for taking up the lower end of the front and back support. The seat back obtains an especially high stability under load in the area of the connecting bodies because it has an extension piece, which is formed on the material parts lying between the channels and which projects upwards in such a way that it props both supports against each other. For the purpose of obtaining a favorable relation between stability under load and weight, this extension piece has, preferably, a double T-shaped profile section, whereby both transverse bars abut on the front and back supports.

Again, for the purpose of obtaining a favorable relation between stability under load and weight, the supports are formed by hollow members, e.g., pipes.

BRIEF DESCRIPTION OF THE DRAWINGS

The invention is represented in detail by one of the working examples in the following drawings, wherein:

FIG. 3 represents a front view of the transverse spar;

FIG. 4 represents a top view of the transverse spar; and

DETAILED DESCRIPTION OF PREFERRED EMBODIMENTS

Figure 1:
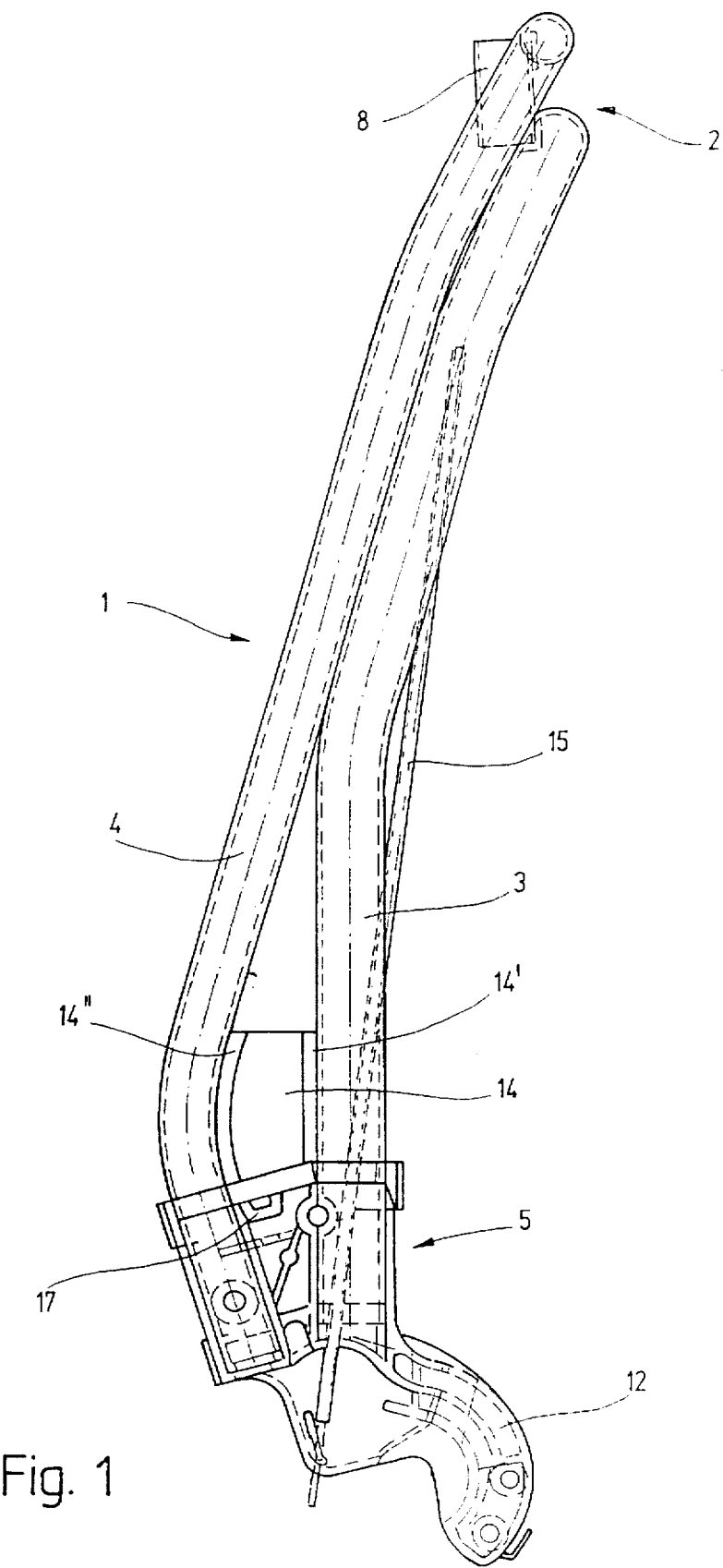
FIG. 1 presents a side view of a side outrigger.

The supporting structure of the seat back of a motor vehicle seat displays a side outrigger (1) on each side of the back rest. Both side outriggers (1), which are designed the same and are mirror-inverted, are connected to each other through an upper transverse spar (2) in the area of their upper ends. Each of the two side outriggers (1) consists of a back support (3) and a front support (4), which are connected to each other by a connecting body (5) in the area of their lower end section.

Figure 2:
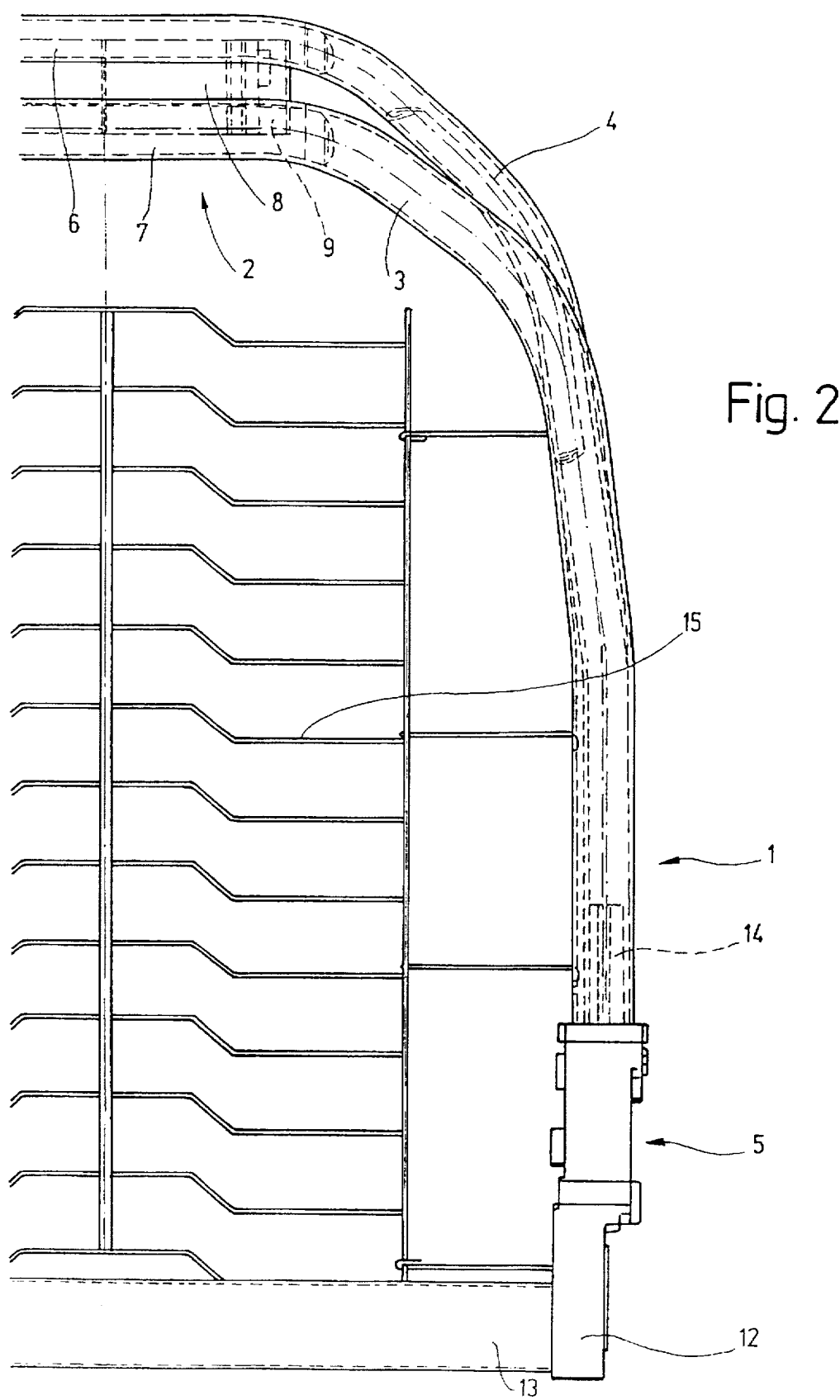
FIG. 2 represents an incompletely shown top view of the front side of the supporting structure of the working example.

As shown in FIG. 1, the back support (3) first extends upwardly from the connecting body (5) in a straight line and then angles towards the back. At the bend, the back support (3) is also bent inward—that is, it is lightly bent against the other side outrigger (1), as is shown in FIG. 2. By way of a hollowing, the back support (3) merges with a transverse part (6) that runs horizontally and is formed as one piece with it. In the area of its lower end section, the front support (4) forms an angle with the back support (3) that opens upwardly and then, as FIG. 1 shows, follows a curve towards the back—forming an acute angle that opens downward—before running in a straight path—albeit one that is inclined toward the back. Just after the bend in the back support (3), the front support (4) is installed on the back support (3). There it is welded inward to the back support (3) on a segment running up to the beginning of the bend. Above this welded segment a inward curve is provided, which, however, is not as sharply curved as the curve of the back support (3). A transverse part (7), which is formed as one piece with the front support (4) and merges with the front support (4), is positioned above the transverse part (6) at a distance from it, as FIG. 1 shows.

Both transverse parts (6 and 7) are rounded on their front side. These two flattened out segments (6' and 7') lie on a common plane and serve as bearing surfaces for a separator (8), which is welded to both transverse parts (6 and 7) and form with them the upper transverse spar (2). As FIG. 4 shows particularly well, the separator (8) is designed as an extruded section, which serves not only as a connection for the two transverse parts (6 and 7), but also as a holding device for a headrest. For this reason, the two side end sections of the separator (8)—each having a guide bore (9) for taking up a support rod—is provided with a headrest. The weld seams, which connect the separator (8) to the two transverse parts (6 and 7), are designated as 10.

Figure 5:
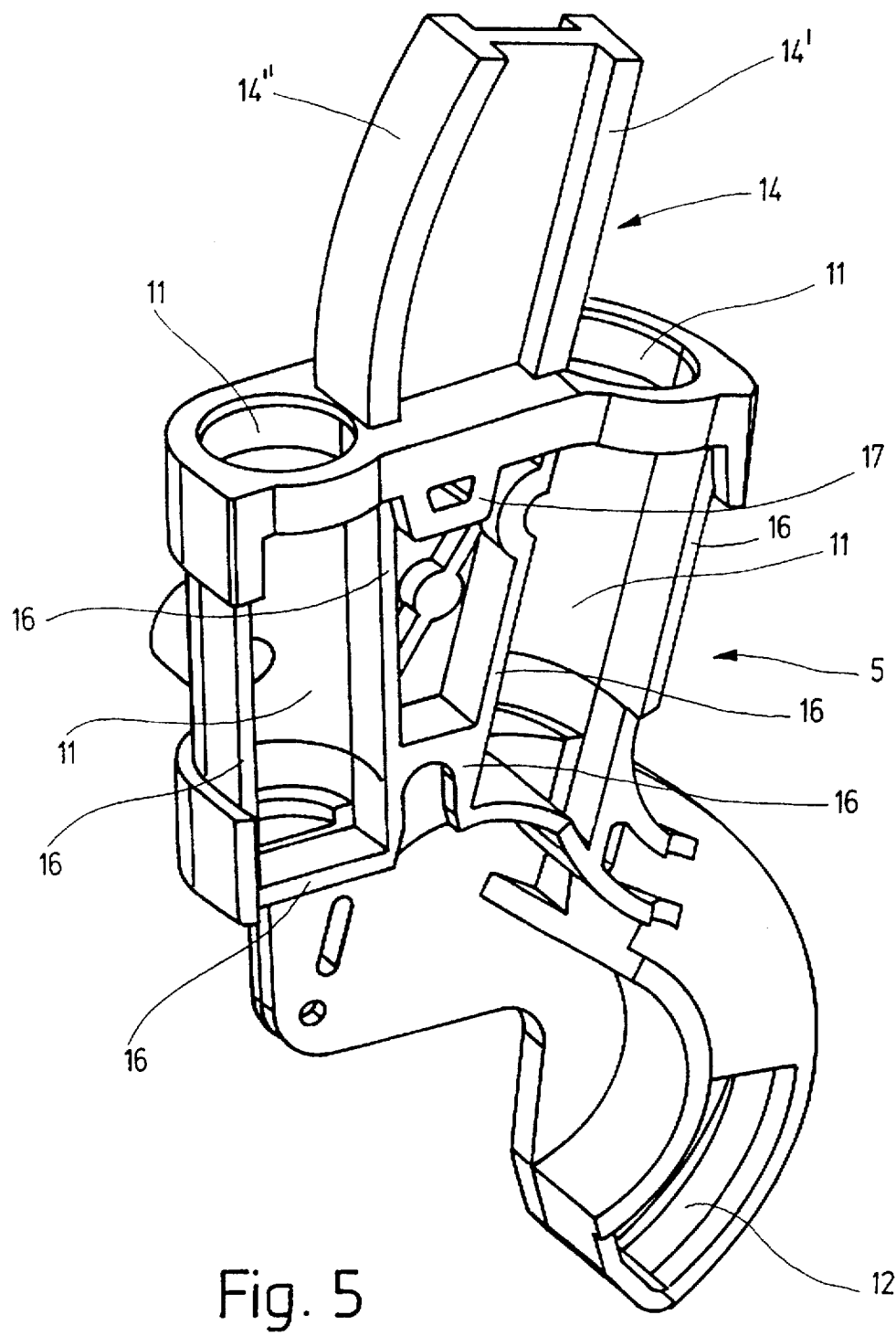
FIG. 5 resents a perspective view of one of the two connecting bodies.

As FIG. 5 especially shows, the two connecting bodies (5), which are designed the same and mirror-inverted (in the working examples they are casting bodies or a press object made from a magnesium alloy), are provided with two channels (11) for taking up the end sections of the back support (3) or the front support (4). From the middle part of the connecting bodies (5) that form these two channels (11) an embracing hook-formed part (12) extends downwards behind the swivel pin of the seat back. The hook-shaped part serves to connect both side outriggers (1) to the lower transverse spar. On the upper side of the middle section that has the channels (11) an extension part (14) is formed, which extends upwards in the area lying between the two channels. This extension part (14), formed as one piece with the middle part, has, as FIG. 4 shows, a double T-shaped profile section. Between the two transverse bars (14' and 14") and the front side of the back support (3) and the back side of the front support (4) a functional clearance exists. The front support (4) is thus supported from behind when stressed in the area of its curve; the back support (3) is supported from the front at the extension part (14) when stressed—which contributes to a considerable increase in the seat back's stability under load both towards the front and the back. Because of the curving of the front support (4), the transverse bar (14") lying on it has a corresponding curve.

Due to weight considerations, the supports and transverse parts are made of pipes.

For the installation of the upper mounting parts of a joint fitting (built in the normal fashion and therefore not shown in the diagram) several cover strips (16), formed as one piece with the connecting body (5), define a level bearing surface. Screws, which are not shown, penetrate the upper mounting parts of the joint fitting, which connects the side outrigger to the seat, and connect the side outrigger to the connecting body (5). A material part (17) of the connecting body (5), which is trapezoidal in the working example, projects from above into a correspondingly formed recess of the upper mounting part and forms—alone or together with one of the gradations bordering the edge of the bearing surface—an additional form-fit connection for the forces directed towards the back or the front.

A flat support (15) is fastened on both back supports (3). On it and on the upper transverse spar (2) and the sidewall supports formed by the two side outriggers (1), there is a cushion that is not shown in the diagram, which is covered by a covering that is also not depicted.

The connection of the seat back to the supporting structure of a seat takes place through two joint fittings, whose mounting part is connected to one or the other side outrigger (1). The upper mounting part abuts on the side of the middle part of the connecting body that is visible in FIG. 5, which overlaps the upper mounting part on the side and top. Feeding forces from the side outrigger (1) into the joint fitting therefore takes place not only by means of screws or something similar, which connect the upper mounting parts to the connecting body (9); the material parts of the connecting body (5) overlapping the upper mounting part on the sides and top also contribute to a highly stable connection.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed:

1. Seat back for vehicle seats, comprising two side outriggers and a transverse spar connected between upper ends of said outriggers whereby each of the two side outriggers are forms of a back support and a front support, said front and back supports are connected to each other in a lower end section of each said support through a connecting body and directly abort one another above the connecting body, from which the front support continues into the transverse spar:

wherein the back support also continues into the transverse spar such that said front support includes a transverse part and said rear support includes a transverse part both said transverse parts form said transverse span which runs from one outrigger to an opposite outrigger, and are positioned at an interval from each other above each other; and wherein the two transverse parts are rigidly connected to one another through a separator mounted there between.

2. Seat back according to claim 1, wherein the separator is a holding device for a headrest.

3. Seat back according to claim 2, wherein the transverse parts further comprise a flattened out segment on each of their front sides and both flattened out segments lying on a common plane from mounting the separator thereon.

4. Seat back according to claim 3, wherein the transverse part of the rear support lies below the transverse part of the front support.

5. Seat back according to claim 4, wherein each connecting body is formed as an extruded section having two channels for engaging a lower end section of the front support and engaging a lower end section of the back support, and each connecting body including an extension part, which is formed on material parts lying between channels and which protrudes upward over the part of the connecting body with the channels to prop the two supports against each other.

6. Seat back according to claim 5, wherein the extension part has an shaped profile section.

7. Seat back according to claim 6, wherein the supports are formed by pipes.

8. Seat back according to claim 7, wherein a flat cushion support is secured between both rear supports.

* * * * *